Figure 1:
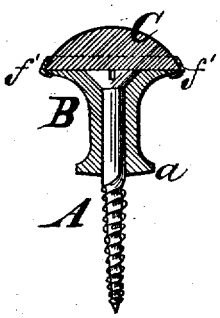

T. C. RICHARDS.

PICTURE NAIL.

No. 10,203. Reissued Sept. 19, 1882.

Witnesses:
R. F. Gaylord,
Louis Sperry

Inventor:
T. C. Richards,
By W. E. Simonds
Atty

N. PETERS, Photo-Lithographer, Washington, D. C.

UNITED STATES PATENT OFFICE.

THOMAS C. RICHARDS, OF WINSTED, CONNECTICUT.

PICTURE-NAIL.

SPECIFICATION forming part of Reissued Letters Patent No. 10,203, dated September 19, 1882.

Original No. 169,730, dated November 9, 1875. Application for reissue filed April 2, 1880.

*To all whom it may concern:*

Be it known that I, THOMAS C. RICHARDS, of Winsted, in the county of Litchfield and State of Connecticut, formerly of the city, county, and State of New York, have invented certain new and useful Improvements in Picture, Shutter, and Furniture Knobs, of which the following is a specification, reference being had to the accompanying drawing, which is a view in central vertical section, except as to the shaft which enters the wall, of a nail made in accordance with my invention.

The invention consists in a combination of, first, a shaft for entering the wall; second, a jacket or sleeve inclosing that part of the shaft intended to project from the wall, adapted on its surface to receive and sustain the picture-cord, adapted at one end to abut against the wall, and adapted at the other end to receive and support an ornamental head or button; third, a head or button attached on the end of the jacket.

The invention further consists in a combination of, first, a threaded shaft to enter the wall; second, a jacket on such shaft and fast thereto; third, a head or button fast to such jacket, by means of which combination the threaded shaft can be both screwed into and unscrewed from the wall by rotating the button.

The state of the art is exemplified, perhaps as well as elsewhere, in the patents of J. B. Sargent, No. 29,720, dated August 21, 1860; A. D. Judd, No. 47,023, dated March 28, 1865; H. P. Brooks, No. 52,781, dated February 20, 1866, and F. J. Seymour, No. 55,917, dated June 26, 1866, none of which shows a jacket intended to cover that part of the shaft which projects from the wall; nor any jacket adapted on its surface to receive and sustain the picture-cord; nor any jacket adapted at one end to abut against the wall; nor any jacket fast to the shaft, so that the shaft may be unscrewed from the wall by rotating the button.

The letter A denotes the shaft which enters the wall. It is screw-threaded.

The letter B denotes the jacket or sleeve, cast of metal, upon the shaft, which, in shrinking as the casting cools, becomes fast to the shaft. This jacket covers substantially all that portion of the shaft which is intended to project from the wall. It is adapted on its surface to receive and sustain a picture-cord. It is formed at one end into the shoulder or base *a*, adapted to abut against the wall, and the other end is formed and adapted to receive the ornamental head or button C, which is made fast to the jacket by means of an annulus, *f'*, one edge of which is turned down upon the button and the other edge of which is turned in upon the jacket, so that by rotating the button the threaded shaft may be both screwed into and unscrewed from a wall.

I claim as my invention—

1. The combination of, first, the shaft for entering a wall; second, the jacket covering that portion of the shaft intended to project from the wall to receive and sustain a picture cord, and with one end to abut against a wall and the other end to receive a head or button; and, third, the ornamental head or button, all substantially as described, and for the purpose set forth.

2. The combination of the threaded shaft, the jacket fast to the shaft, and the button fast to the jacket, all constructed substantially as described, and for the purpose set forth.

THOS. C. RICHARDS.

Witnesses:

GEORGE M. CARRINGTON,
SIDNEY F. DICKERMAN.